United States Patent [19]

Fontaine

[11] Patent Number: 4,787,205
[45] Date of Patent: Nov. 29, 1988

[54] VEHICLE BRAKE SYSTEM

[76] Inventor: William G. Fontaine, 451 S. E. 3rd Ave., Pompano Beach, Fla. 33060

[21] Appl. No.: 907,325

[22] Filed: Sep. 15, 1986

Related U.S. Application Data

[63] Continuation-in-part of Ser. No. 701,787, Feb. 14, 1985, abandoned, which is a continuation-in-part of Ser. No. 346,551, Feb. 8, 1982, abandoned.

[51] Int. Cl.$^4$ ............................................. B60T 13/00
[52] U.S. Cl. ..................................... 60/547.1; 60/560; 60/581; 60/582
[58] Field of Search ............. 60/545, 551, 560, 547.1, 60/581, 582, 593, 594; 91/391 R; 180/273, 275; 188/109; 303/19

[56] References Cited

U.S. PATENT DOCUMENTS

| 3,001,369 | 9/1961 | Allais | 60/581 |
|---|---|---|---|
| 3,048,979 | 8/1962 | Grigsby | 60/547.1 |
| 3,143,928 | 8/1964 | Wahlstrom | 91/391 R |
| 3,195,309 | 7/1965 | Cripe | 60/550 |
| 3,487,451 | 12/1969 | Fontaine | 303/19 |
| 3,500,946 | 3/1970 | Boyajian | 180/273 |
| 3,761,138 | 9/1973 | Fontaine | 303/9 |
| 3,790,223 | 2/1974 | Fontaine | 91/459 |
| 3,799,300 | 3/1974 | Cochrane | 60/547.1 |
| 3,830,330 | 8/1974 | Fontaine | 180/101 |
| 3,845,932 | 11/1974 | Fontaine | 251/63.4 |
| 3,846,599 | 11/1974 | Fontaine | 200/61.89 |
| 3,871,497 | 3/1975 | Bessiere | 91/6 |
| 3,888,552 | 6/1975 | Fontaine | 303/6 R |
| 3,895,698 | 7/1975 | Fontaine | 303/19 |
| 4,172,980 | 10/1979 | Hsieh | 180/271 |
| 4,244,186 | 1/1981 | Mehren | 60/547.1 |
| 4,389,154 | 6/1983 | Minor | 180/273 |
| 4,458,490 | 7/1984 | Newhouse | 60/547.1 |
| 4,468,926 | 9/1984 | Hodkinson | 60/550 |
| 4,553,470 | 11/1985 | Shimazu | 60/551 |

FOREIGN PATENT DOCUMENTS

| 1163694 | 2/1964 | Fed. Rep. of Germany | 60/551 |
|---|---|---|---|
| 403668 | 12/1933 | United Kingdom | |

Primary Examiner—Abraham Hershkovitz
Attorney, Agent, or Firm—Oltman and Flynn

[57] ABSTRACT

A vehicle brake system, with the usual arrangement of a power booster axially aligned with the brake master cylinder piston and engaged between it and the brake pedal, has a fluid pressure differential-operated actuator offset from the conjoint axis of the power booster and the master cylinder piston. The actuator is coupled to the master cylinder piston through a mechanical linkage which provides a substantial mechanical advantage. The actuator causes the brakes to be applied independent of the brake pedal in response to any of several sensed conditions which dictate that the vehicle should not be moving.

10 Claims, 5 Drawing Sheets

4,787,205

VEHICLE BRAKE SYSTEM

CROSS-REFERENCE TO RELATED APPLICATIONS

This application is a continuation-in-part of U.S. patent application Ser. No. 701,787, filed Feb. 14, 1985, now abandoned, which is a continuation-in-part of my U.S. patent application Ser. No. 346,551, filed Feb. 8, 1982, now abandoned.

SUMMARY OF THE INVENTION

This invention relates to retro-fit vehicle brake systems actuators which control the application of the brakes in response to particle sensed conditions, such as, but not limited to, a vacant driver's seat, low engine oil pressure, engine overheating, attempted theft of the vehicle, alcohol on the breath of a person in the driver's seat or an unlatched engine compartment hood.

A particular advantage of the present invention is that the actuator is especially adapted to be added onto an existing conventional vehicle brake system having a power booster between the brake pedal and the usual master cylinder without affecting the usual interaction among them.

Another advantage of this invention is that the part of the actuator which responds to a sensed condition is coupled to the brake master cylinder through a mechanical linkage providing a substantial mechanical advantage.

A principal object of this invention is to provide a novel vehicle brake system having an actuator for applying the vehicle brakes in response to any of one or more sensed conditions which dictate that the vehicle should not be moving while that sensed condition exists.

Another object of this invention is to provide such a system in which the actuator is adapted to be retro-fitted into an existing conventional brake system which includes a brake pedal, power booster and master cylinder.

Further objects and advantages of the invention will be apparent from the following detailed description of certain presently-preferred embodiments, with reference to the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DETAILED DESCRIPTION

Figure 1:
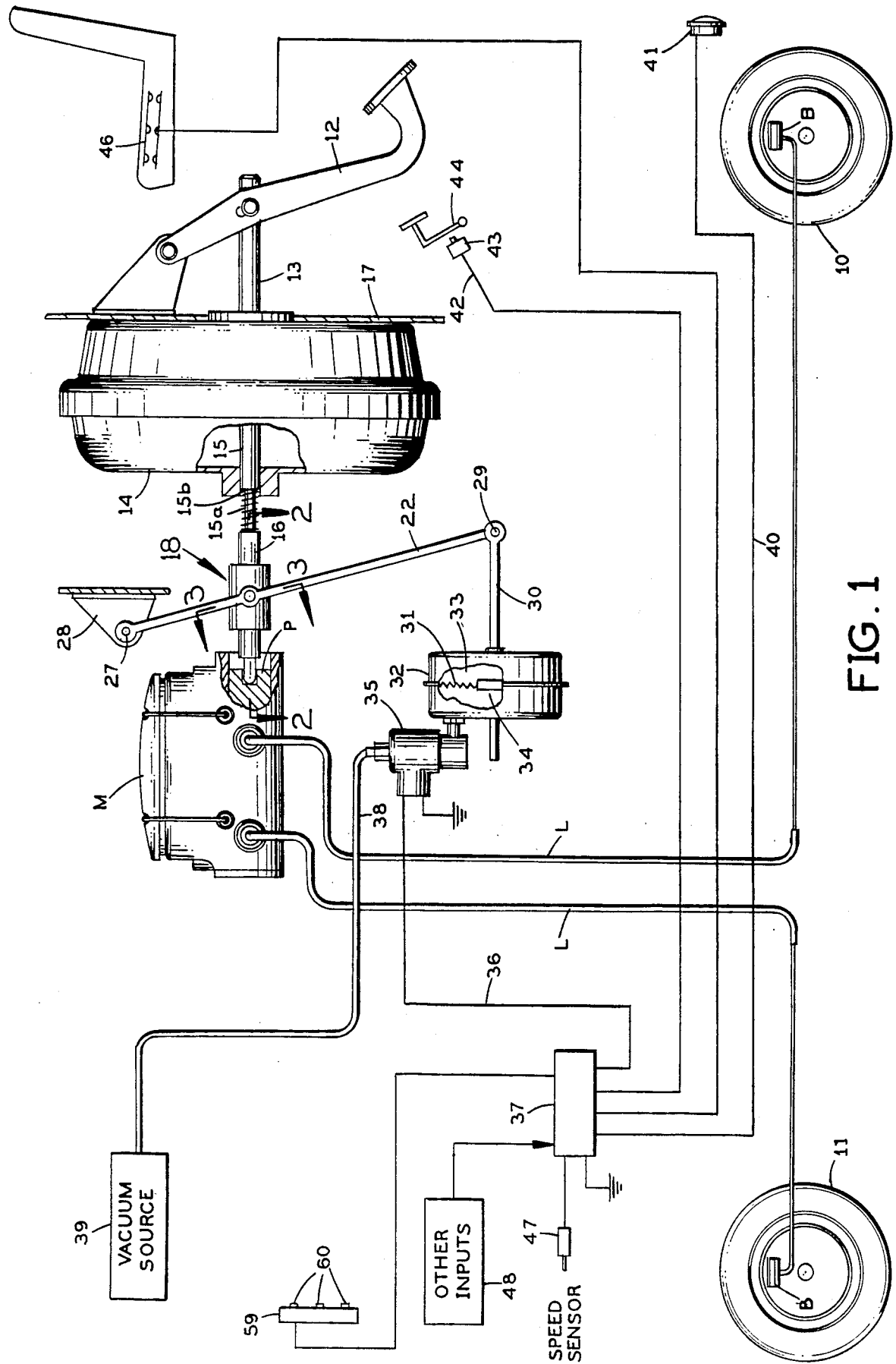
FIG. 1 shows schematically a vehicle brake system with a vacuum-operated actuator in accordance with the present invention.

Referring to FIG. 1, the rear wheels 10 of the vehicle (only one of which is shown) and the front wheels 11 (only one of which is shown) have respective hydraulic brakes 8 which are connected to the master brake cylinder M by hydraulic lines L. The master cylinder has a slidable piston P whose position controls the hydraulic pressure in the brake lines L.

A pivoted brake pedal 12 of conventional design is mechanically coupled to the piston P in the master cylinder through a horizontally reciprocable brake pedal rod 13, to which the brake pedal is slidably coupled pivotally, a power booster or servo device 14 having a horizontally reciprocable output shaft 15 with an outer end segment 15a of reduced diameter, and an intermediate shaft 16 acting between the power booster output shaft and the master cylinder piston P.

The power booster 14 is mounted on the inside of the firewall 17 between the engine compartment and the passenger compartment of the vehicle. The power booster 14 preferably is as shown and described in detail in my U.S. patent application Ser. No. 540,060, filed Oct. 7, 1983.

Figure 2:
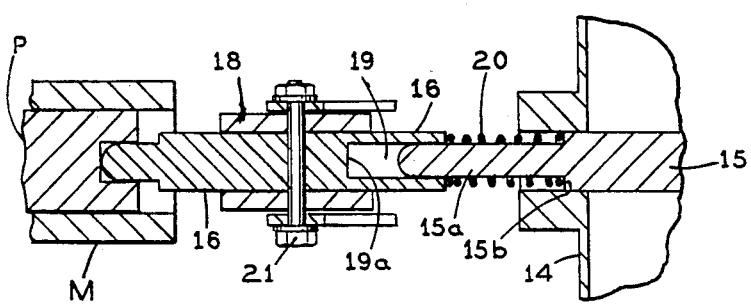
FIG. 2 is an enlarged fragmentary longitudinal section taken along the line 2—2 in FIG. 1.

As shown in detail in FIG. 2, the intermediate shaft 16 extends through a cylindrical sleeve 18. At its end toward the power booster 14 (the right end in FIG. 2), shaft 16 has a cylindrical recess 19 which slidably receives the reduced outer end segment 15a of the power booster output shaft 15. A coil spring 20 extends snugly but slidably around the outer segment 15a of shaft 15 and is engaged under compression between this end of intermediate shaft 16 and a transverse annular shoulder 15b presented by the power booster shaft 15 where the reduced outer end segment 15a is joined to it. Normally, spring 20 biases shafts 15 and 16 apart so that, as shown in FIG. 2, only part of the outer end segment 15a is slidably received in recess 19 in the intermediate shaft 16. When the power booster output shaft 15 is displaced far enough to the left in FIGS. 1 and 2, its reduced outer end segment 15a moves into engagement with the inner end face 19a of recess 19 in the intermediate shaft 16 and continued movement of the power booster shaft 15 in this direction causes it to push the intermediate shaft 16 in the same direction. Thus, the outer end segment 15a of the power booster shaft, the recess 19 in the intermediate shaft and the spring 20 form a lost-motion connection between the power booster shaft 15 and the intermediate shaft 16 such that the power booster shaft can move a predetermined distance to the left before imparting movement to the intermediate shaft.

Figure 3:
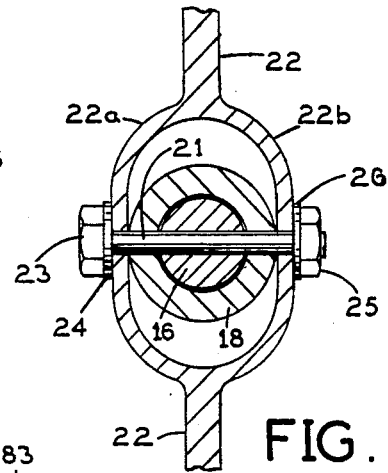
FIG. 3 is an enlarged fragmentary cross-section taken along the line 3—3 in FIG. 1.

A cross pin 21 (FIG. 2) extends snugly through aligned transverse openings in intermediate shaft 16 and the surrounding sleeve 18. Just outside the sleeve 18 the cross shaft is pivotally connected to the opposite legs 22a and 22b (FIG. 3) of a bifurcated segment of a rigid lever 22. The cross pin 21 at one end has an enlarged head 23 located outside the leg 22a of lever 22, with a flat, annular, metal washer 24 engaged between them. The opposite end of a cross pin 21 is screw-threaded for the attachment of a nut 25 located outside the leg 22b of lever 22. A metal washer 26 is sandwiched between nut 25 and the outside of this leg of the lever. As shown in FIG. 1, the lever 22 extends up past sleeve 18 and intermediate shaft 16 and has its upper end pivotally connected at 27 to a bracket 28 which is rigidly and fixidly mounted on the vehicle. Lever 22 also extends down below sleeve 18 and shaft 16 and has its lower end pivotally connected at 29 to one end of a horizontally reciprocable actuator shaft 30.

Figure 9:
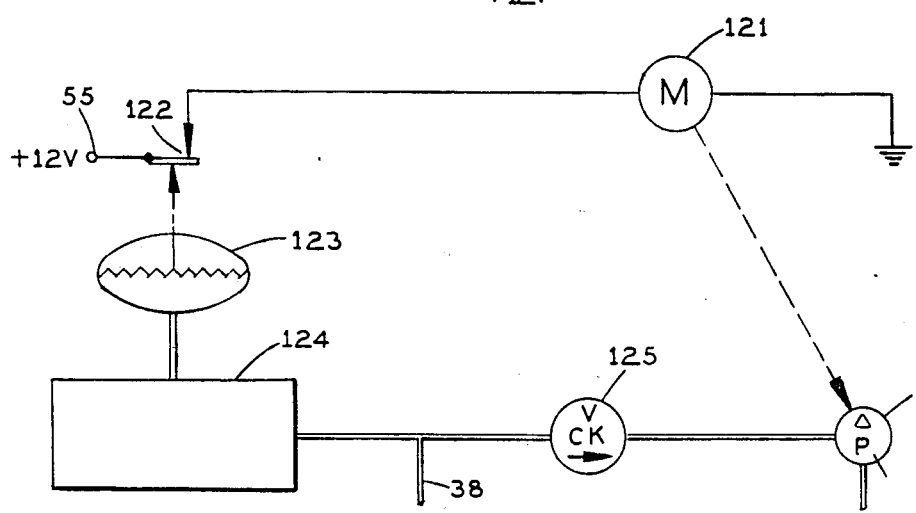
FIG. 9 shows schematically a vacuum system which may be the "vacuum source" shown generally by the block so labelled in FIG. 1.

Shaft 30 is connected to a flexible diaphragm 31 inside a generally cylindrical actuator housing 32, which provides chambers 33 and 34 on opposite sides of the diaphragm. Chamber 33 is vented to the atmosphere. Housing 32, diaphragm 31 and shaft 30 together form an actuator for applying the vehicle brakes under certain conditions described hereinafter. Chamber 34 is connected to an electrically-operated valve 35 of known design which has a solenoid that can be energized via line 36 from an electrical control circuit 37 of known design, which is shown in detail in FIG. 5 and described hereinafter. Valve 35 has a first inlet port which is connected to the atmosphere and a second inlet port which is connected via a conduit 38 to a source 39 of vacuum, one example of which is shown in FIG. 9 and described hereinafter.

When the valve solenoid is energized, valve 35 connects its air inlet port to chamber 34 in actuator housing 32 and blocks its vacuum inlet port from actuator chamber 34.

When the valve solenoid is not energized, valve 35 connects its vacuum inlet port to actuator chamber 34 and blocks its air inlet port from actuator chamber 34. This causes the actuator diaphragm 31 to move to the left in FIG. 1, pulling shaft 30 to the left and causing lever 22 to move clockwise about its fixed pivot 27. This movement of the lever causes sleeve 18 and intermediate shaft 16 to move to the left, pushing the master cylinder piston P to the left to apply the vehicle brakes. This brake-applying action takes place in response to a valve-operating signal from the electrical control circuit 37 which is independent of the brake pedal 12, so that the brake pedal need not be depressed by the vehicle driver to apply the brakes.

Figure 4:
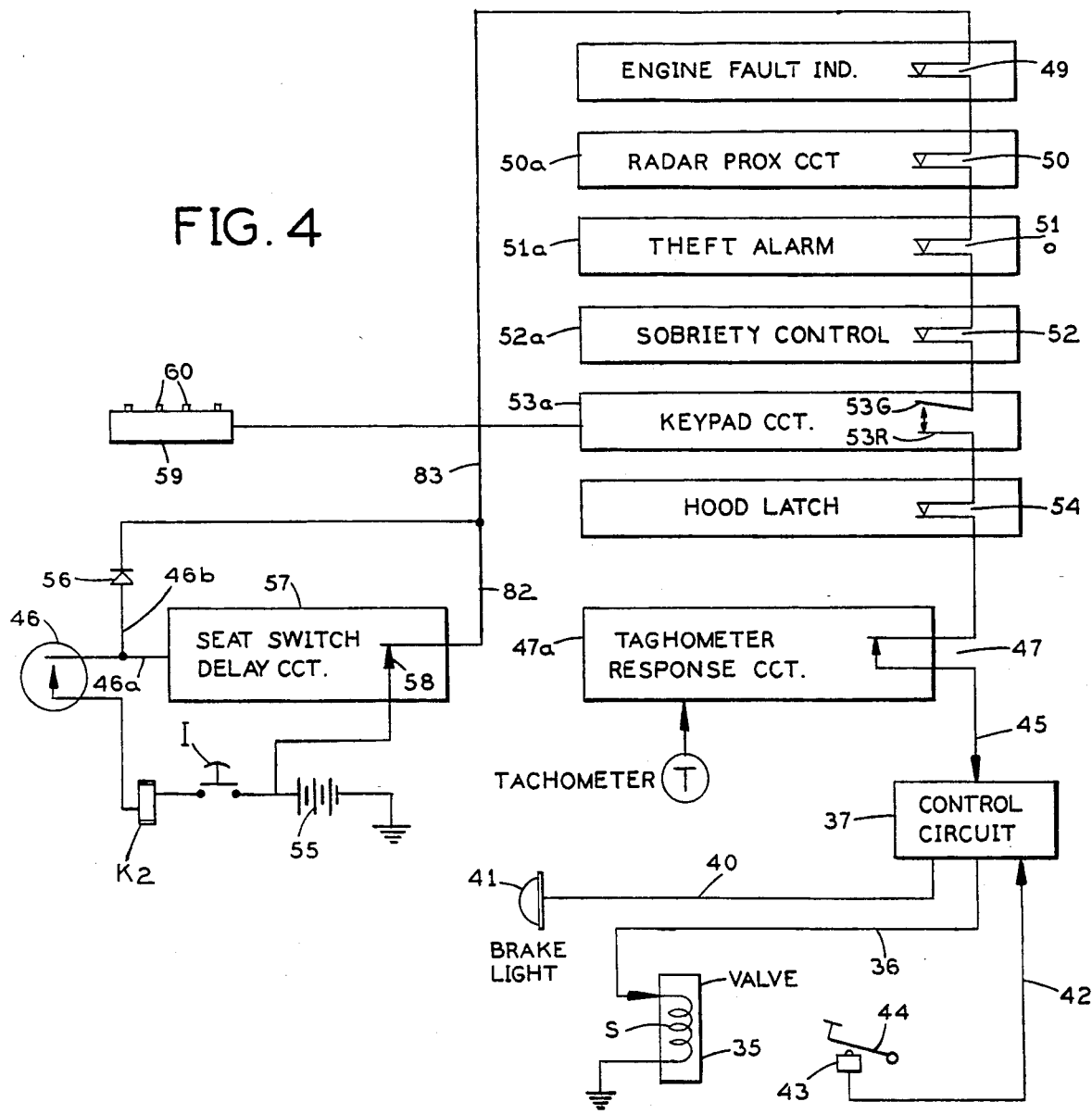
FIG. 4 is a schematic diagram of the electrical circuit for controlling the operation of the vacuum-operated actuator in the brake system of FIG. 1.

Referring to FIG. 4, the control circuit 37 for actuator valve 35 has two outputs: one via the previously-mentioned line 36 to the solenoid S of valve 35, and the other via a line 40 to the brake lights 41 on the vehicle.

The control circuit 37 has a first input via line 42 from an accelerator pedal switch 43 which is positioned to be operated by the usual accelerator pedal 44 on the vehicle. Preferably, switch 43 is normally open and it is closed only when the accelerator pedal 44 is depressed by the driver. When switch 43 is closed, it enables the control circuit 37 to energize the solenoid S in brake actuator valve 35.

The control circuit 37 has a second input via line 45 which is connected to several sets of series-connected, normally-closed sets of relay contacts and switches to the positive terminal of the vehicle battery. Referring to FIG. 4, the ignition switch I, a relay coil K2 and a seat switch 46 are connected in series with each other between the positive battery terminal 55 and several series-connected sets of relay contacts 49, 50, 51, 52, 53G, 53R, 54 and 47.

Associated with the seat switch 46 is a delay circuit 57, described in detail hereinafter with reference to FIG. 6. This delay circuit has a normally-closed set of relay contacts 58 connected between the positive battery terminal and a line 82 leading through line 83 to the chain of relay contacts 49, 50, 51, 52, 53G, 53R, 54 and 47 in FIG. 4.

Relay contacts 47 are under the control of a tachometer response circuit 47a, described in detail hereinafter with reference to FIG. 7.

The seat switch 46 (FIG. 4) has one terminal connected through relay coil K2 and the engine ignition switch I on the vehicle to the positive terminal 55 of the vehicle battery and its opposite terminal connected through a rectifier 56 to a line 83 leading to the first set of relay contacts in the series, here shown as the engine fault relay contacts 49 although the series-connected sets of relay contacts may be connected in any desired order different from the order shown. Seat switch 46 is normally-open and it is closed by the weight of a person sitting in the driver's seat. When the driver gets off the seat, switch 46 opens substantially immediately. The delay circuit 57 is operatively connected to the seat switch 46 such that opening of the previously-closed seat switch starts a timing interval of the delay circuit. Relay contacts 58 remain closed during this timing interval, keeping line 83 energized, and are opened by the delay circuit at the completion of this timing interval, thus opening the circuit between the positive battery terminal and the control circuit 37.

The engine fault relay contacts 49 are controlled by a pressure switch operatively arranged to sense the oil pressure of the vehicle engine and/or by a sensor which senses overheating of the engine. When the oil pressure drops below a safe value or the engine overheats, relay contacts 49 are opened automatically, thereby causing the vehicle brakes to be applied. Normally, the reduction of engine oil pressure or engine overheating will be shown in a warning light or a gage on the dashboard, so as the vehicle begins to slow down the driver can look at the dashboard to determine whether oil pressure or engine overheating is the cause.

Relay contacts 50 are operatively connected in a radar proximity circuit 50a of known design which senses the presence of a radar signal, such as from law enforcement officers trying to catch speeders. If such a signal is detected, relay contacts 50 will be opened automatically, causing the vehicle brakes to be applied. This reduces the vehicle's speed and lets the driver know that his vehicle is in a radar surveillance zone since he can eliminate engine oil pressure or engine overheating as a possible cause of the automatic braking operation by looking at the dashboard.

Relay contacts 51 are connected in a theft alarm circuit 51a of any suitable design on the vehicle. If the vehicle is parked and a thief attempts to start the engine, the theft alarm circuit will open relay contacts 51 automatically, thus applying the brakes automatically so that the vehicle will move not at all or very slowly if the thief manages to get the engine started.

Relay contacts 52 are part of a sobriety control circuit 52a of known design which includes a sensor for sensing alcohol in the breath of a person in the driver's seat of the vehicle. Relay contacts 52 will be opened automatically, applying the brakes, to prevent a drunk driver from getting the vehicle moving.

Relay contacts 53G and 53R are part of a keypad circuit 53a under the control of a keypad 59 of known design, which may have several push buttons 60 that must be operated in a predetermined sequence. Otherwise, the keypad circuit 53a will cause relay contacts 53R to open, thus applying the brakes and preventing the vehicle from being driven away.

Relay contacts 54 are operatively arranged to open automatically if the engine compartment hood is not fully closed. In that case, the brakes would be applied, preventing the car from being driven away in this potentially unsafe condition.

The vehicle speed relay contacts 47 are connected in a speed resolver circuit 47a having its input from a speed resolver T on the vehicle. When the vehicle speed exceeds a predetermined value, relay contacts 47 are opened automatically to apply the vehicle brakes.

The seat switch 46 and any one or more of the sets of relay contacts 47, 49, 50, 51, 52, 53G and 53R, and 54 may be omitted, and one or more additional switches or sets of relay contacts may be added, if desired. For example, there may be a set of relay contacts which are opened when the tailgate of a vehicle is open, or there may be several door switches on an armored car, each of which opens when the corresponding door is open.

CONTROL CIRCUIT - FIG. 5

Figure 5:
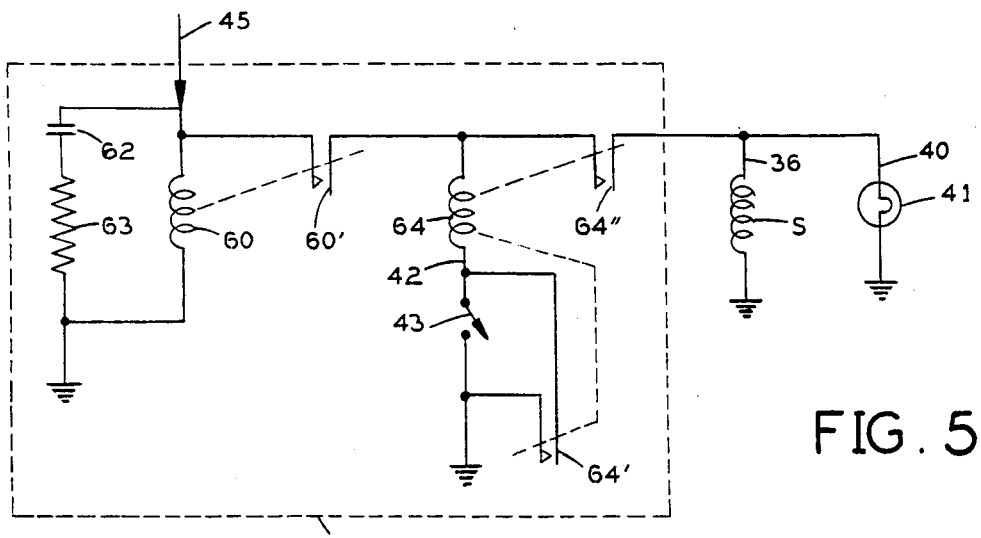
FIG. 5 is a schematic electrical circuit diagram of the block in FIG. 4 labelled "control circuit"

Referring to FIG. 5, the control circuit 37 for the brake actuator valve 35 of FIG. 4 has a first relay coil 60 connected between the input line 45 and ground. A capacitor 62 and a current limiting resistor 63 are connected in series with each other between line 45 and ground (i.e., in parallel with the series-connected first relay coil 60).

When energized, relay coil 60 closes a set of normally-open relay contacts 60', which are connected between input line 45 and the upper terminal of a second relay coil 64. The accelerator pedal switch 43 is connected via line 42 (also shown in FIG. 4) between the lower terminal of relay coil 64 and ground. When energized, relay coil 64 closes a set of normally-open relay contacts 64', which is connected across switch 43. When energized, relay coil 64 also closes a second set of relay contacts 64", which is connected in series between the contacts 60' of the first relay and the upper terminals of solenoid S of the actuator valve 35 (FIG. 4) and the brake light 41.

When a driver enters the vehicle and sits on the driver's seat, closing the seat switch 46, and closes the ignition switch I but does not depress the gas pedal 44, if all of the relay contacts 47, 49, 50, 51, 52, 53G, 53R and 54 are closed (FIG. 4), and with the accelerator pedal switch 43 not yet closed, the first relay coil 60 will be energized from the vehicle battery. When thus energized, relay coil 60 closes its contacts 60'.

When the driver depresses the gas pedal, closing the accelerator switch 43, the second relay coil 64 is energized, closing its contacts 64' and 64". The closing of relay contacts 64" completes the energization circuit for solenoid S of the actuator valve 35. The now-closed relay contacts 64' provide a holding circuit for relay coil 64 to keep it energized independent of the gas pedal switch 43. With valve solenoid S energized, the actuator valve 35 (FIG. 1) applies atmospheric pressure to the brake actuator chamber 34, thus releasing the vehicle brakes B.

If the vehicle goes over a bump which causes the driver to momentarily release the closing force which his weight normally exerts on the seat switch 46, the first relay coil 60 will be kept energized for a few seconds by capacitor 62 and resistor 63.

If the driver leaves the driver's seat without opening the ignition switch I to turn off the vehicle engine, relay coil 60 will become de-energized after the time delay provided by the R-C circuit 62, 63 and then relay coil 64 wlil become de-energized, thereby de-energizing the valve solenoid S because of the opening of relay contacts 64". This causes valve 35 to connect the brake actuator chamber 34 to vacuum, and the brake actuator causes the master cylinder piston P to apply the brakes.

SEAT SWITCH DELAY CIRCUIT - FIG. 6

Figure 6:
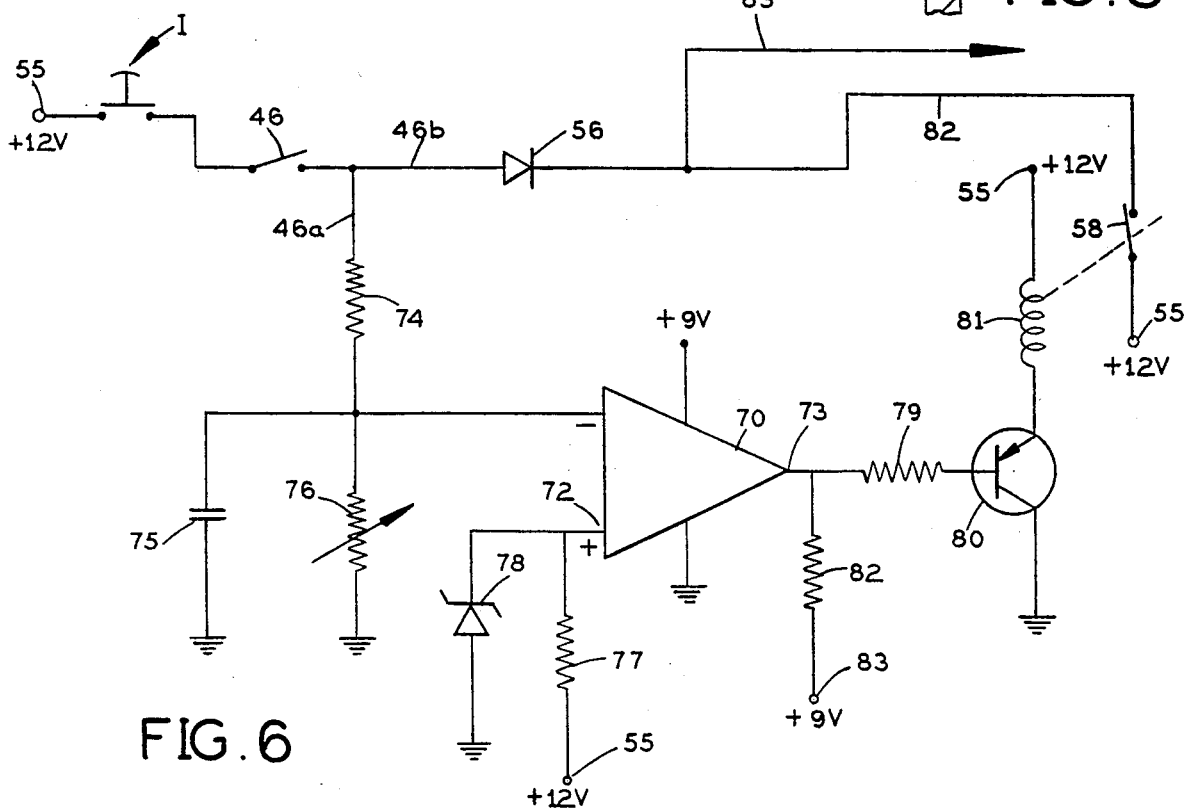
FIG. 6 is a schematic electrical circuit diagram of the block in FIG. 4 labelled "seat switch delay cct."

Referring to FIG. 6, the time delay circuit 57 (FIG. 4) for the seat switch 46 includes an operational amplifier 70 known design having an inverting input 71, a non-inverting input 72 and an output 73. The seat switch 46 is connected via line 46a through a resistor 74 to the inverting input 71 of the op amp. A capacitor 75 and a variable resistor 76 are connected in parallel with each other between the inverting 71 and ground. The non-inverting input 72 of the op amp is connected through a resistor 77 to the positive battery terminal 55. A Zener diode 78 is connected between the non-inverting input 72 and ground.

The output 73 of op amp 70 is connected through a resistor 79 to the basse of a transistor 80 with a grounded collector. The emitter of transistor 80 is connected through a relay coil 81 to the positive battery terminal 55. A bias resistor 82 is connected between the output 73 of op amp 70 and a +9 volt terminal 83 energized from the vehicle battery. Relay coil 81 operates the normally closed set of relay contacts 58 also shown in FIG. 4.

When seat switch 46 is closed, it applies a high potential on the inverting input 71 of amplifier 70, causing the amplifier to produce a low output signal which keeps transistor 80 off, thus holding relay coil 81 de-energized. When the seat switch 46 opens, the R-C circuit 75, 76 maintains the high on the inverting input 71 long enough to keep relay coil 81 de-energized for a few seconds. After this delay interval, the output of amplifier 70 goes high, turning on transistor 80 and causing relay coil 81 to be energized, opening its contacts 58 to disconnect the battery voltage from lines 82 and 83 leading to the engine fault relay contacts 49 in FIG. 4.

SPEED RESOLVER CIRCUIT - FIG. 7

Figure 7:
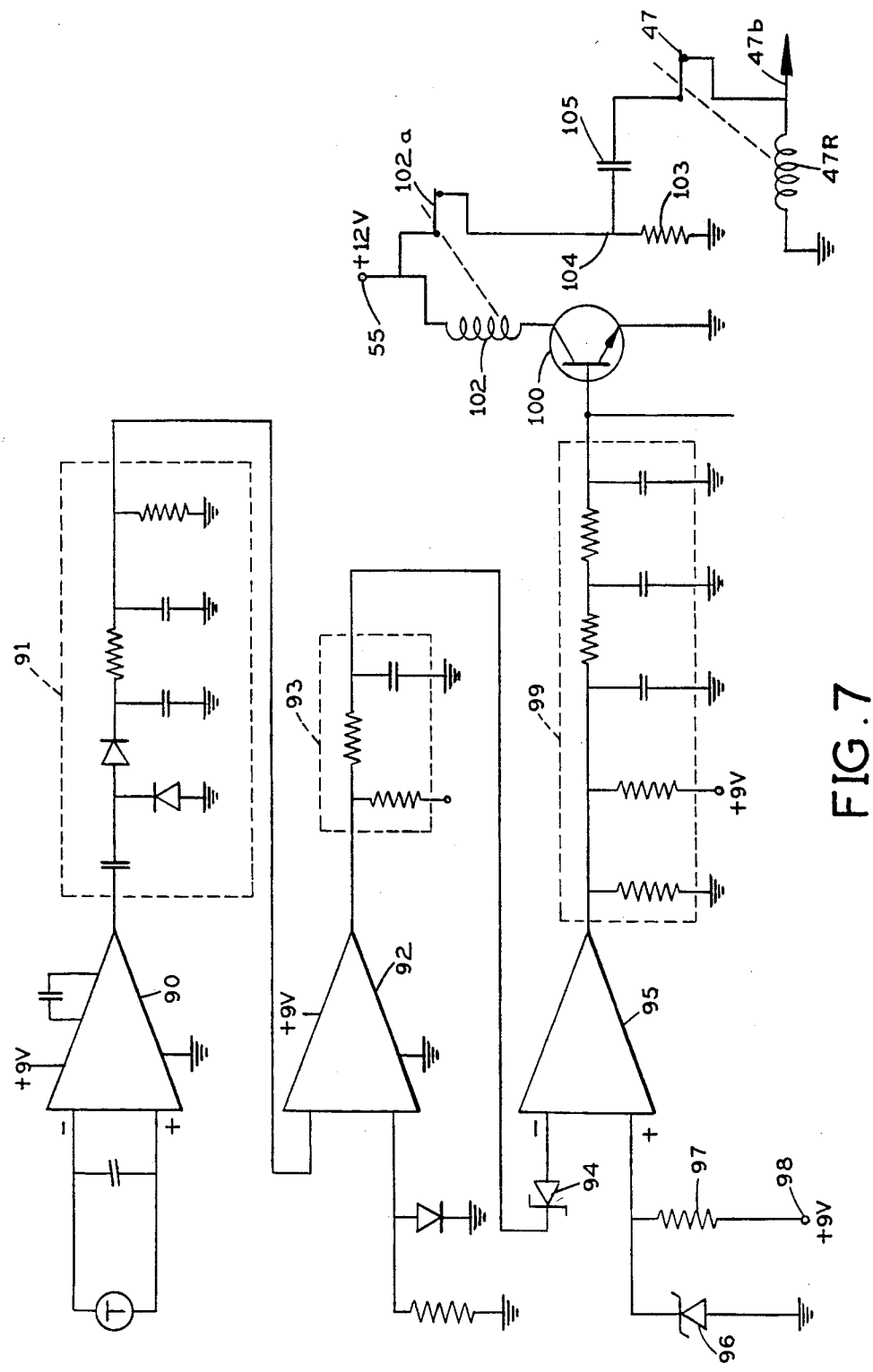
FIG. 7 is a schematic electrical circuit diagram of the block in FIG. 4 labelled "tachometer response cct."

The speed resolver response circuit 47a in FIG. 1 is shown in detail in FIG. 7. It has a first operational amplifier 90 with its inverting and non-inverting input terminals connected across the speed resolver T, which is driven by the vehicle engine. The output of amplifier 9 is connected through a rectifier-filter network of conventional design which is enclosed in the dashed-line block 91 in FIG. 7. The output of this network is connected to the inverting input terminal of a second operational amplifier 92. The output amplifier of 92 is connected through another conventional filter network 93 and a first Zener diode 94 to the inverting input of a third operational amplifier 95. A second Zener diode 96 is connected between the non-inverting input of amplifier 95 and ground. A resistor 97 is connected between a +9 volt terminal 98 and the non-inverting input of amplifier 95.

Amplifier 95 and Zener diodes 96 and 97 together provide a threshold circuit, so that the output of amplifier 95 is low only when the input potentials on its inverting and non-inverting inputs are above a predetermined threshold value determined by the Zener diodes. The output of amplifier 95 is high when these input potentials are below the threshold value.

The output of amplifier 95 is connected through an additional filter network 99 of known design to the base of a grounded-emitter transistor 100. The collector of transistor 100 is connected to the +12 volt battery terminal 55 through the operating coil 102 of a relay having a set of normally closed contacts 102a connected in series with a resistor 103 between terminal 55 and ground. The juncture 104 between relay contacts 102a and resistor 103 is connected to ground through a capacitor 105, the set of normally closed relay contacts 47 shown in FIG. 4, and the operating coil 47R of the relay which has the contacts 47.

When transistor 100 is turned on, it completes an energization path for relay coil 102, which opens its contacts 102a. Relay coil 47R is energized through capacitor 105 a short time (e.g., 4 seconds) after relay contacts 102a open. Relay coil 47R then briefly opens its contacts 47 long enough to cause the brake actuator to apply the brakes. Then, after relay coil 47R becomes de-energized its contacts 47 re-close.

Thus, the relay contacts 47 in FIG. 4 remain closed as long as the signal from tachometer T is high enough to keep the output of amplifier 95 in FIG. 7 low. This condition prevails as long as the engine speed is above a certain value. When the engine speed drops to zero or substantially zero, the speed resolver T causes the output of amplifier 95 to go high, turning on transistor 100 and causing the relay coils 102 and 47R to be energized in succession and thus causing the normally-closed relay contacts 47 to open.

KEYPAD CIRCUIT - FIG. 8

Figure 8:
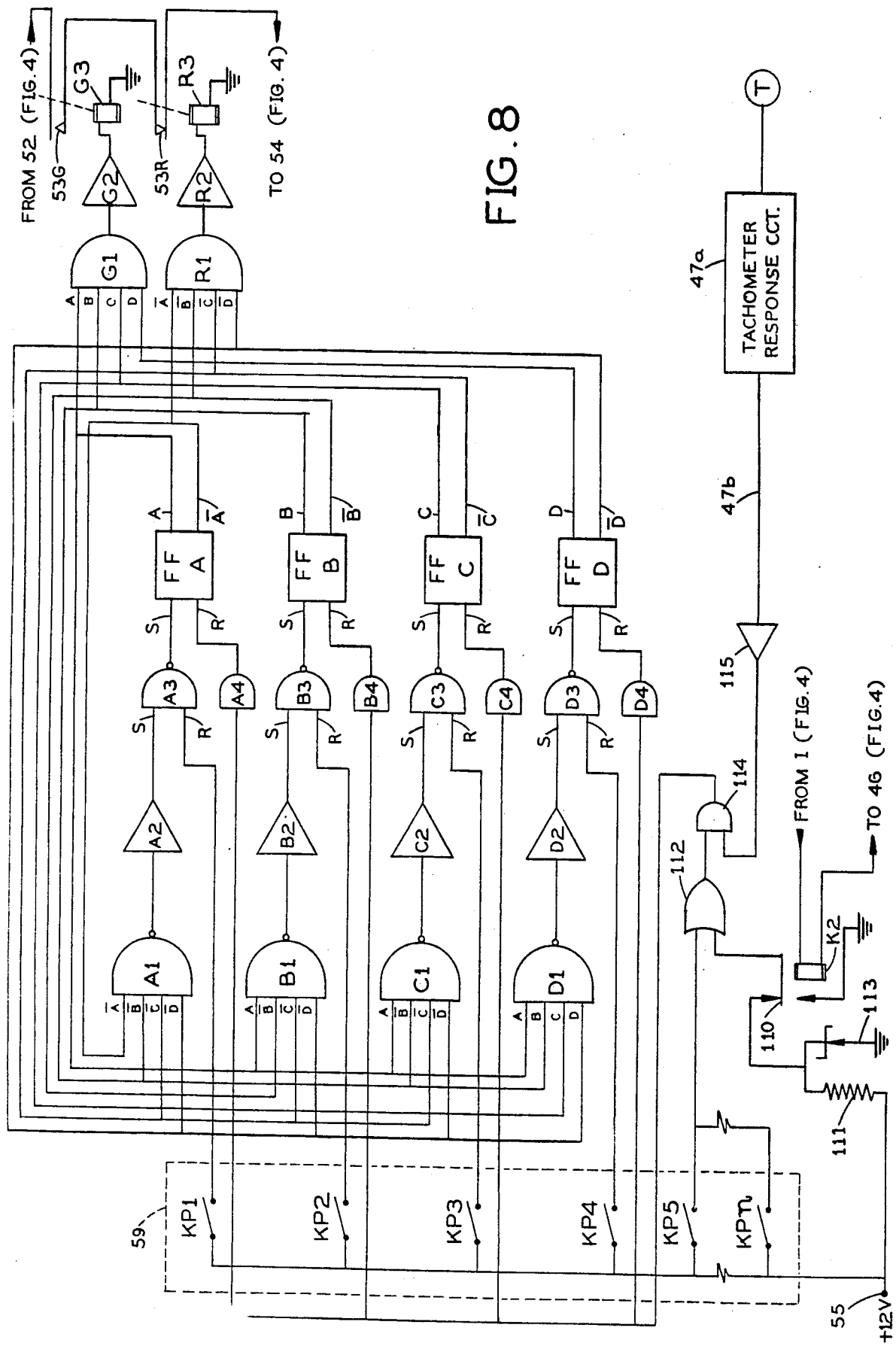
FIG. 8 is a schematic electrical circuit diagram of the block in FIG. 4 labelled "keypad cct."

FIG. 8 shows the keypad circuit 53a and keypad 59 in FIG. 4. The normally open keypad switches which are operated by the push-button keys 60 in FIG. 4 are designated KP1, KP2, KP3 . . . KPn in FIG. 7.

The keypad circuit requires that certain keys, e.g. keys KP1-KP4, be operated one at a time and in the sequence 1, 2, 3, 4 in order to de-energize solenoid S of valve 35 and thereby release the brake-applying action of actuator 132 in FIG. 1.

The keypad circuit has four four-input NAND gates A1, B1, C1 and D1, each of which can be activated by a certain combination of the flip-flops FFA, FFB, FFC and FFD, each having a pair of output leads, of which the upper one is the true and the lower one is the inverted output; e.g., the flip-flop FFA has an upper true output A which is high when the flip-flop is set, and low when it is cleared, and the lower inverted output A which is high when the flip-flop is cleared and low when it is set. Accordigly, when the circuit is cleared, all inputs to the NAND-gate A1 are high, causing the upper input S to the two-input NAND-gate A3 to be high, through an inverter A2.

To begin setting the keypad circuit the first keypad switch KP1 is closed and it applies a plus 12 volt potential to the lower input R of NAND-gate A3, which is therefore activated and produces a low at the input S of the flip-flop FFA. This flip-flop is a so-called J-K flip-flop that responds to a low-going edge at its input S and is therefore being set, so that its output A goes high and A goes low. The remaining three flip-flops FFB, FFC and FFD are still in cleared state.

As a result, the four-input NAND gate B1, which has the inputs A, B, C, D, becomes enabled while the NAND-gate A1 becomes disabled. Similarly the keypad switch KP2, and only that one, must be operated to set the flip-flop FFB. If another keypad switch e.g., key KP3 were operated, it would have no effect on flip-flop FFC because the NAND-gate C-1 would not be enabled at this time. Also, if one of the keypad switches KP5-KPn were operated, all four flip-flops FFA-FFD would be reset by a plus 12 volt potential applied through an OR gate 112 to the upper input of a NAND gate 114. Because the keypad 59 is operated as a preliminary to starting the engine, at this time the output 47b of the tachometer response circuit 47a shown in FIG. 7 will be low. As shown in FIG. 8, this output is connected through an inverter 115 to the lower input of NAND gate 114, so at this time this NAND gate input is high. The low output thus produced from NAND gate 114 would reset all the flip-flops FFA-FFD through AND gates A4, B4, C4 and D4 to the R input of the flip-flops.

Returning now to the operation of the keypad switch KP2, the second flip-flop FFB would be set, and in the same manner as described hereinabove, the third NAND-gate C1, having inputs A, B, C, D would be prepared for the operation of the third keypad switch KP3 and only that one, and in the same way, the fourth flip-flop FFD would be set by the fourth keypad switch KP4.

With all four flip-flops set, the four inputs A, B, C & D to a four input NAND-gate G1 would all be high and its output would go low, which would operate the relay G3 through the inverter G2 and close its contacts 53G in FIG. 4 which is one of the conditions for releasing the brake actuator 12. At this time the relay contacts 53R are in their normal, closed condition. This closed condition of the relay contacts 53G and 53R is designated the "Green Condition" which allows the vehicle to operate, as opposed to the "Red Condition" that is created when all the flip-flops FFA-FFD are in the cleared state and therefore enable a four-input NAND-gate R1, having the input condition A, B, C, D, which will energize a relay coil R3 to open the normally-closed set of relay contacts 53R. This will cause the actuator 32, 31, 30 in FIG. 1 to hold the brakes applied.

The flip-flops FFA, FFB, FFC and FFD in FIG. 8 can be reset by the relay whose operating coil K2 is connected between the ignition switch 1 and the seat switch 46 in FIG. 4. Relay coil K2 operates a set of contacts 110 which have the position shown in FIG. 8 when relay coil K2 is not energized. In this condition the relay contacts connect the positive battery terminal 55 through a resistor 111 to the lower input terminal of OR gate 112. A Zener diode 113 is connected between ground and the juncture of resistor 111 and the now-closed contacts of this relay. The upper input terminal of OR gate 112 is connected through the switches KP5 . . . KPn to the +12 volt terminal.

Due to the high input on its lower input terminal, OR gate 112 applies a high to the upper input terminal of NAND gate 114. At this time, the lower input terminal of AND gate 114 also is high, as described. Thus, before the entire chain in FIG. 4 made up of seat switch 46, ignition switch I, and relay contacts 49, 50, 51, 52, 53G, 53R, 54 and 47 provides a closed circuit, the NAND gate 114 output presents a low to the R inputs of all of the flip-flops FFA, FFB, FFC and FFD in FIG. 8.

When the driver sits on the driver's seat and closes the seat switch 46, operates the keypad to produce the green condition in which both sets of relay contacts 53G and 53R are closed, and operates the ignition switch I, this closes the chain and completes the energization circuit for relay coil K2. The relay coil operates its contacts 110 to place a low on the lower input terminal of OR gate 112. The low output of this OR gate causes the NAND gate 114 to apply a high to the R input of each of the flip-flops FFA, FFB, FFC and FFD. This prepares the R inputs to clear the flip-flops in case one of the wrong keypad switches KP5 ... KPn is operated.

VACUUM SOURCE - FIG. 9

FIG. 9 shows schematically one possible embodiment of the vacuum source 39 in FIG. 1. It includes a vacuum pump 120 driven by an electric motor 121, which is energized from the +12 volt battery terminal 55 through switch contacts 122 operated by a vacuum regulator 123 of conventional design which senses the vacuum in a vacuum storage canister 124. The input of vacuum pump 120 is connected to the vacuum storage canister 124 through a one-way check valve 125. The vacuum input line 38 for the actuator valve 35 in FIG. 1 is connected to the vacuum storage canister 124 ahead of the check valve.

As long as the vacuum in canister 124 is less than a predetermined value (i.e., the absolute pressure is too high), the regulator 123 will keep its switch contacts 122 closed, thus completing the energization path for motor M. Motor M drives the vacuum pump 120 to increase the vacuum (i.e., reduce the absolute pressure) in storage canister 124 until the desired vacuum level is reached, at which time the regulator 123 will open switch contacts 122 to turn off the motor.

If desired, the vacuum-operated actuator 31-34 in FIG. 1 can be replaced by a hydraulically-operated actuator or a pneumatically-operated actuator operatively coupled to the master cylinder piston through a mechanical linkage similar to the one shown in FIG. 1. This invention was a forerunner of the power assist (Power Booster) system.

I claim:
1. In a vehicle brake system having:
  a movable brake pedal;
  a master cylinder having a movable pressure-applying member therein for applying and releasing the vehicle brakes;
  a power booster acting between said brake pedal and said pressure-applying member in the master cylinder, said power booster having a pressure responsive member therein movable toward and away from said pressure-applying member in the master cylinder to produce corresponding movement of said pressure-applying member in the actuator to apply and release the brake;
  and reciprocable shaft means acting between said pressure responsive member in the power booster and said pressure-applying member in the master cylinder;
the improvement which comprises:
  an actuator offset from said shaft means and having a member movable parallel to said shaft means:
  pivoted rigid lever means pivotally coupled separately to said shaft means and to said movable member in the actuator to displace said shaft means in response to movement of said movable member in the actuator;
  and means for causing movement of said movable member in the actuator in response to a pre-determined condition of the vehicle.
2. A brake system according to claim 1 wherein said means for causing movement of said movable member in the actuator is operative to apply a fluid pressure differential across said movable member to effect said movement.
3. A brake system according to claim 1 wherein:
  said shaft means is reciprocable horizontally between said power booster and said master cylinder;
  said actuator is below said shaft means;
  and said lever means has a fixed pivotal mounting above said shaft means.
4. A brake system according to claim 1 wherein the length of said lever means from its pivoted mounting down to its pivotal coupling to said shaft means is substantially less than its length from its pivotal coupling to said shaft means down to its pivotal coupling to said actuator.
5. A brake system according to claim 4 wherein said shaft means includes a lost-motion coupling between said power booster and said pivotal coupling of said lever means to said shaft means.
6. In a vehicle brake system having:
  a movable brake pedal;
  a master cylinder having a movable pressure-applying member therein for applying and releasing the vehicle brakes;
  a power booster acting between said brake pedal and said brake applying member in the master cylinder, said power booster having a pressure responsive member therein movable toward and away from said pressure-applying member in the master cylinder to effect corresponding movement of said pressure-applying member in the actuator to apply and release the brakes;
  and horizontally reciprocable shaft means acting between said pressure responsive member in the power booster and said pressure-applying member in the master cylinder;
the improvement which comprises:
  a rigid lever pivotally coupled to said shaft means;
  pivotal support means for said lever above said shaft means;
  means providing a lost-motion coupling in said shaft means between said power booster and the pivotal coupling between said lever and said shaft means;
  an actuator located below said shaft means and having a displacement member movable parallel to said shaft means;
  means pivotally coupling said lever to said displacement member in said actuator;
  and means for causing movement of said displacement member, in response to a predetermined condition of the vehicle, to produce a corresponding movement of said pressure applying member in the master cylinder.
7. A vehicle brake system according to claim 6 wherein the length of said lever between said shaft means and said pivotal support means is substantially less than its length between said shaft means and its pivotal coupling to said displacement member in the actuator.
8. A vehicle brake system according to claim 7 wherein:
  said shaft means comprises interfitting parts which are slidable relative to one another lengthwise of said shaft means;
  and spring means acting between said interfitting parts of said shaft means to bias said pressure responsive member in the power booster away from said pressure-applying member in the master cylinder.

9. A brake system according to claim 8 wherein said means for causing movement of said displacement member in the actuator comprises means for establishing a fluid pressure differential on opposite sides of said displacement member to cause said movement.

10. A brake system according to claim 6 wherein said means for causing movement of said displacement member in the actuator comprises means for establishing a fluid pressure differential on opposite sides of said displacement member to cause said movement.

* * * * *